United States Patent
Shuma

(10) Patent No.: US 9,020,991 B2
(45) Date of Patent: Apr. 28, 2015

(54) SYSTEM AND METHOD FOR ANALYZING AVAILABLE SPACE IN DATA BLOCKS

(75) Inventor: Kevin P. Shuma, Celina, TX (US)

(73) Assignee: CA, Inc., New York, NY (US)

( * ) Notice: Subject to any disclaimer, the term of this patent is extended or adjusted under 35 U.S.C. 154(b) by 371 days.

(21) Appl. No.: 13/572,120

(22) Filed: Aug. 10, 2012

(65) Prior Publication Data

US 2014/0046920 A1  Feb. 13, 2014

(51) Int. Cl.
*G06F 12/00* (2006.01)
*G06F 17/30* (2006.01)

(52) U.S. Cl.
CPC .................................... *G06F 17/30* (2013.01)

(58) Field of Classification Search
None
See application file for complete search history.

(56) References Cited

U.S. PATENT DOCUMENTS

| | | | |
|---|---|---|---|
| 6,801,903 B2 * | 10/2004 | Brown et al. | 1/1 |
| 7,237,062 B2 * | 6/2007 | Lubbers et al. | 711/114 |
| 7,519,637 B2 * | 4/2009 | Shuma et al. | 1/1 |
| 7,716,177 B2 * | 5/2010 | Zhang et al. | 707/609 |
| 8,285,691 B2 * | 10/2012 | Shuma et al. | 707/693 |
| 8,392,382 B2 * | 3/2013 | Marwah et al. | 707/693 |
| 2004/0117408 A1 * | 6/2004 | Bharadwaj et al. | 707/200 |
| 2005/0097130 A1 * | 5/2005 | Hankin | 707/104.1 |
| 2009/0024678 A1 * | 1/2009 | Milby et al. | 707/205 |
| 2009/0265398 A1 * | 10/2009 | Olix et al. | 707/205 |
| 2011/0258242 A1 * | 10/2011 | Eidson et al. | 707/825 |
| 2012/0078879 A1 * | 3/2012 | Shuma et al. | 707/715 |
| 2012/0131301 A1 * | 5/2012 | Maeda et al. | 711/171 |
| 2013/0013651 A1 * | 1/2013 | Shuma | 707/807 |

* cited by examiner

Primary Examiner — Hexing Liu
(74) Attorney, Agent, or Firm — Myers Bigel Sibley & Sajovec, P.A.

(57) ABSTRACT

A system and method is provided for determining an available space in one or more data blocks. A physical data storage area associated with one or more portions of a database may be determined. An available space in each data block of one or more data blocks in the physical data storage area may be determined. A number of new data rows that can be added to each data block may also be determined.

7 Claims, 9 Drawing Sheets

---

800

AREA REO   BLKSIZE 4,096   TRACKS   150   BLOCKS   1,800   URI YES   DSOP 4 RANDOM FOR OLREORG

802 ⇒ TBL CMP USER COMPRESSION   RECLN 112   RECORDS 31,950
REO

| | GROUP# | BLOCKS IN-USE % EMPTY % | KBYTES IN-USE % EMPTY % | ROWS IN-USE DELETED *AVAIL | FREESP MAX MIN AVG | ROWS MAX MIN AVG | ROWLEN MAX MIN AVG | \-\-\-\-\-\-\- FREESPACE IN BLOCKS \-\-\-\-\-\-\-\-\-\- | | | |
|---|---|---|---|---|---|---|---|---|---|---|---|
| | | | | | | | | 0 TO 1/4K 3K 16K | 1/2K 4K 20K | 1K 8K 24K | 2K 12K 32K |
| | 1 | 500 100<br>0 0 | 1,218 61<br>782 39 | 11,124<br>0<br>6,876 | 3,982<br>62<br>1,602 | 36<br>1<br>22 | 112<br>112<br>112 | 64<br>127<br>0 | 35<br>48<br>0 | 54<br>0<br>0 | 172<br>0<br>0 |
| 806 ⇒ | 2 | 500 100<br>0 0 | 1,338 67<br>662 33 | 12,222<br>0<br>5,778 | 3,982<br>62<br>1,356 | 36<br>1<br>24 | 112<br>112<br>112 | 150<br>100<br>0 | 32<br>52<br>0 | 44<br>0<br>0 | 122<br>0<br>0 |
| | 3 | 239 48<br>261 52 | 942 47<br>1,058 53 | 8,604<br>0<br>9,396 | 4,094<br>62<br>2,167 | 36<br>0<br>17 | 112<br>112<br>112 | 239<br>0<br>0 | 0<br>261<br>0 | 0<br>0<br>0 | 0<br>0<br>0 |
| | 4 | 0 0<br>298 100 | 1 0<br>1,191 100 | 0<br>0<br>10,728 | 4,094<br>4,094<br>4,094 | 0<br>0<br>0 | 0<br>0<br>0 | 0<br>0<br>0 | 0<br>298<br>0 | 0<br>0<br>0 | 0<br>0<br>0 |
| 808 ⇒ | TOTALS | 1,241 69<br>559 31 | 3,498 49<br>3,694 51 | 31,950<br>0<br>32,778 | 4,094<br>62<br>2,104 | 36<br>0<br>18 | 112<br>112<br>112 | 453<br>227<br>0 | 67<br>659<br>0 | 98<br>0<br>0 | 294<br>0<br>0 |

804 ⇒ (header row pointer)

DATA AREA: ABC

Dataset name: PROD.ABC
Volume(s): DCMSP1, DCMSP2
Space: 30,000 Tracks
Block size: 8192

TABLE NAME – REO
OCCURRENCE – REORG022-REORG P001
TABLE ID        – 1
RECORD LENGTH   – 100 / 112
RECORDS IN TABLE – 31,950
LENGTH OF KEY/ELEMENTS – 504
NUMBER OF KEYS      – 4
NUMBER OF ELEMENTS  – 1
CHANGE MASTER KEY   – YES
DUPLICATE MASTER KEY – YES
RECOVER – YES
LOGGING – YES
PIPELINE – YES
DB COMPRESSION   – NO
USER COMPRESSION – NO
CLUSTER KEY ID      – 0
CLUSTER KEY LENGTH  – 0

AUTHID              – REORG022
TABLE SQLNAME       – REORG
DOMAIN CONSTRAINT   – NO
DL1-T CONSTRAINT    – NO
TABLE CONSTRAINED   – NO
CURRENT CHECK PENDING – LOAD SET          – NO
                        RELATED TABLE     – NO
                        FORWARD RECOVERY  – NO
TRIGGER(S)          – NO
CURRENT ROW(S) VIOLATE CONSTRAINT(S) – NO
DATA SET NAME – DCMQA.QAMUF4.REO1022
VOLUMES    – DCMSP1
KEY-NAME   ID   LENGTH   MASTER   NATIVE   UNIQUE   DIRECT   KEY INC   CBS USE   OCCURRENCE / KEY SQLNAME              STATUS
   REOK1   0001   7        YES      YES      YES      NO       YES        YES     KEY1 P001                              LD
                                                                                  REOK1_REO01022

AREA NAME – REO
OCCURRENCE – REORG022-REORG P001
AREA SQLNAME –
BLOCK LENGTH       – 4,096           SLACK –  0
OVERFLOWS IN AREA –      0
BLOCKS IN USE  –    890
BLOCKS UNUSED  –    910
TOTAL BLOCKS   –  1,800              CXXMAINT LINK  – YES
TOTAL TRACKS   –    150              DYNAMIC EXTEND – NO
PERCENT FULL   –     49              DYN.EXT.TRACKS –  0
DEVICE TYPE – 3390
BLOCKS/TRACK – 12
DSOP MODE – RANDOM FOR OLREORG
TABLE LOADED – YES, DATE–2/04/2011, TIME-18.26.45
INDEX LOADED – YES
DATADICTIONARY BASE  –  2
DATA BASE ID CHANGE  – NO
DEFINITION POSTED VIA – DATADICTIONARY CATALOG
SQL-INTENT – Y
UNIQUE ROW IDENTIFIERS (URI) –           51,000
TABLE BEING REFERENCED   – NO
TABLE REFERENCING         – NO
ALL REFERENCING IN THIS BASE – YES
HISTORY CHECK PENDING – LOAD SET         – NO
                        RELATED TABLE    – NO
                        FORWARD RECOVERY – NO
                        FORCED OFF       – NO
HISTORY ROW(S) VIOLATE CONSTRAINT(S) – NO
DATA DTF/DDNAME – REO1022

FIG. 5

AREA REO   BLKSIZE 4,096   TRACKS   150   BLOCKS   1,800   URI YES   DSOP 1 RANDOM

TBL CMP USER COMPRESSION   RECLN 112   RECORDS 31,950
REO

| GROUP# | BLOCKS IN-USE % EMPTY % | KBYTES IN-USE % EMPTY % | ROWS IN-USE DELETED *AVAIL | FREESP MAX MIN AVG | ROWS MAX MIN AVG | ROWLEN MAX MIN AVG | FREESPACE IN BLOCKS 0 TO 1/4K / 3K / 16K | 1/2K / 4K / 20K | 1K / 8K / 24K | 2K / 12K / 32K |
|---|---|---|---|---|---|---|---|---|---|---|
| 1 | 500 100 / 0 0 | 1,970 98 / 30 2 | 18,000 / 0 / 0 | 62 / 62 / 62 | 36 / 36 / 36 | 112 / 112 / 112 | 500 / 0 / 0 | 0 / 0 / 0 | 0 / 0 / 0 | 0 / 0 / 0 |
| 2 | 388 78 / 112 22 | 1,527 76 / 473 24 | 13,950 / 0 / 4,050 | 4,094 / 62 / 969 | 36 / 0 / 28 | 112 / 112 / 112 | 387 / 1 / 0 | 0 / 112 / 0 | 0 / 0 / 0 | 0 / 0 / 0 |
| 3 | 0 0 / 500 100 | 1 0 / 1,999 100 | 0 / 0 / 18,000 | 4,094 / 4,094 / 4,094 | 0 / 0 / 0 | 0 / 0 / 0 | 0 / 0 / 0 | 0 / 500 / 0 | 0 / 0 / 0 | 0 / 0 / 0 |
| 4 | 0 0 / 298 100 | 1 0 / 1,191 100 | 0 / 0 / 10,728 | 4,094 / 4,094 / 4,094 | 0 / 0 / 0 | 0 / 0 / 0 | 0 / 0 / 0 | 0 / 298 / 0 | 0 / 0 / 0 | 0 / 0 / 0 |
| TOTALS | 890 49 / 910 51 | 498 49 / 3,694 51 | 31,950 / 0 / 32,778 | 4,094 / 62 / 2,104 | 36 / 0 / 18 | 112 / 112 / 112 | 887 / 1 / 0 | 0 / 910 / 0 | 0 / 0 / 0 | 0 / 0 / 0 |

600

602 → (AREA REO line)
604 → (TBL CMP line)
606 → (group rows)
608 → (TOTALS row)

FIG. 6

700

AREA NAME - REO
OCCURRENCE - REORG022-REORG P001
AREA SQLNAME -
BLOCK LENGTH    -    4,096       SLACK -    0
OVERFLOWS IN AREA -          0
BLOCKS IN USE -     1,241
BLOCKS UNUSED -        559
TOTAL BLOCKS -     1,800        CXXMAINT LINK -   YES
TOTAL TRACKS -       150        DYNAMIC EXTEND -   NO
PERCENT FULL -        68        DYN.EXT.TRACKS -    0
DEVICE TYPE - 3390
BLOCKS/TRACK - 12
DSOP MODE   - RANDOM FOR OLREORG
TABLE LOADED - YES, DATE-2/04/2011, TIME-18.52.12
INDEX LOADED - YES
DATADICTIONARY BASE -   2
DATA BASE ID CHANGE  - NO
DEFINITION POSTED VIA - DATADICTIONARY CATALOG
SQL-INTENT - Y
UNIQUE ROW IDENTIFIERS (URI) -              51,000
TABLE BEING REFERENCED      - NO
TABLE REFERENCING            - NO
ALL REFERENCING IN THIS BASE - YES
HISTORY CHECK PENDING - LOAD SET           - NO
                        RELATED TABLE       - NO
                        FORWARD RECOVERY - NO
                        FORCED OFF          - NO
HISTORY ROW(S) VIOLATE CONSTRAINT(S) - NO
DATA DTF/DDNAME - REO1022

STATUS
     KEY1 P001                                                                                              LD
        REOK1_REO1022

TABLE NAME – REO
OCCURRENCE - REORG022-REORG P001
TABLE ID   -    1
RECORD LENGTH   -   100 /   112
RECORDS IN TABLE -        31,950
LENGTH OF KEY/ELEMENTS -     504
NUMBER OF KEYS    -      4
NUMBER OF ELEMENTS   -      1
CHANGE MASTER KEY   - YES
DUPLICATE MASTER KEY - YES
RECOVER - YES
LOGGING - YES
PIPELINE - YES
DB COMPRESSION   - NO
USER COMPRESSION - NO
CLUSTER KEY ID     -    0
CLUSTER KEY LENGTH -    0

AUTHID         - REORG022
TABLE SQLNAME  - REORG
DOMAIN CONSTRAINT - NO
DL1-T CONSTRAINT  - NO
TABLE CONSTRAINED - NO
CURRENT CHECK PENDING - LOAD SET        - NO
                        RELATED TABLE    - NO
                        FORWARD RECOVERY - NO

TRIGGER(S)       - NO
CURRENT ROW(S) VIOLATE CONSTRAINT(S) – NO
DATA SET NAME - DCMQA.QAMUF4.REO1022
VOLUMES   - DCMSP1
KEY - NAME   ID  LENGTH  MASTER  NATIVE  UNIQUE  DIRECT  KEY INC  CBS USE OCCURRENCE / KEY SQLNAME
     REOK1 0001    7       YES     YES     YES     NO      YES     YES        KEY1 P001

FIG. 7

| AREA REO | BLKSIZE 4,096 | TRACKS 150 | BLOCKS 1,800 | URI YES | DSOP 4 RANDOM FOR OLREORG |
|---|---|---|---|---|---|
| TBL CMP REO | | | | | |
| | USER COMPRESSION | RECLN 112 | RECORDS 31,950 | | |

802 ⇨

804 ⇨

| GROUP# | BLOCKS IN-USE % EMPTY % | KBYTES IN-USE EMPTY % | ROWS IN-USE DELETED *AVAIL | FREESP MAX MIN AVG | ROWS MAX MIN AVG | ROWLEN MAX MIN AVG | FREESPACE IN BLOCKS 0 TO 1/4K 3K 16K | 1/2K 4K 20K | 1K 8K 24K | 2K 12K 32K |
|---|---|---|---|---|---|---|---|---|---|---|
| 1 | 500 100 0 0 | 1,218 61 782 39 | 11,124 0 6,876 | 3,982 62 1,602 | 36 1 22 | 112 112 112 | 64 127 0 | 35 48 0 | 54 0 0 | 172 0 0 |
| 2 | 500 100 0 0 | 1,338 67 662 33 | 12,222 0 5,778 | 3,982 62 1,356 | 36 1 24 | 112 112 112 | 150 100 0 | 32 52 0 | 44 0 0 | 122 0 0 |
| 3 | 239 48 261 52 | 942 47 1,058 53 | 8,604 0 9,396 | 4,094 62 2,167 | 36 0 17 | 112 112 112 | 239 0 0 | 0 261 0 | 0 0 0 | 0 0 0 |
| 4 | 0 0 298 100 | 1 0 1,191 100 | 0 0 10,728 | 4,094 4,094 4,094 | 0 0 0 | 0 0 0 | 0 0 0 | 0 298 0 | 0 0 0 | 0 0 0 |
| TOTALS | 1,241 69 559 31 | 3,498 49 3,694 51 | 31,950 0 32,778 | 4,094 62 2,104 | 36 0 18 | 112 112 112 | 453 227 0 | 67 659 0 | 98 0 0 | 294 0 0 |

806 ⇨ (Group 2)

808 ⇨ (TOTALS)

FIG. 8

SYSTEM AND METHOD FOR ANALYZING AVAILABLE SPACE IN DATA BLOCKS

TECHNICAL FIELD

The present disclosure relates to the field of relational database systems and products. More specifically, the present disclosure relates to determining available space in data blocks.

BACKGROUND

In file structures such as sequential tape or sequential disk, data rows are added into a data block until it is full, then the next data block is accessed and so on. A data block is considered "full" when data rows no longer will fit in the data block, is considered "partially full" when at least one data row will fit in the data block, and is considered "empty" when there are no data rows in the data block. As such, an estimated percentage of fullness of a data area is computed as ("full data blocks"+"partial data blocks")/"total data blocks". Because data rows are sequentially filled in such file structures, there should be only one partial block at any given time. The estimated percentage is therefore a close approximation of actual fullness or capacity.

However, various operations on databases may decrease the accuracy of the estimated percentage of fullness. For example, relational database management systems provide various data space reuse options that allow data rows to be deleted from data blocks so that the space created from the deleted rows may be reused at a later time. In these cases, there may be a number of partial blocks instead of only one. As such, the above formula provides the percentage of data blocks in use (i.e., data blocks with at least one data row in them) and not the overall fullness of the data area (i.e., the physical area containing one or more data blocks for a database table or groups of tables), thereby decreasing the accuracy of the estimated percentage.

In addition, relational database management systems may support various data row compression methods. These methods compress data rows before storing them in fixed length data blocks. The amount and size of data rows that are stored on a data block can widely vary. When adding this complexity in with the various reuse options, the formula described above becomes an increasingly less accurate calculation to determine fullness of the data area.

Furthermore, data rows may have been deleted but the deletions may not have been committed. For these data rows, the space in the data block is "reserved" until the transaction is completed. These data rows are considered logically deleted but physically present.

Thus, what is needed is an efficient and reliable way to determine how full a data area is and to determine an available space in a data area.

These and other drawbacks exist.

BRIEF SUMMARY

Various systems, computer program products, and methods for determining available space in one or more data blocks are described herein.

According to one aspect of the present disclosure, the method may include a plurality of operations. In some implementations, the operations may include receiving a request to determine an available space associated with a portion of a database. In some implementations, the operations may include determining a physical data storage area associated with the portion of a database in response to the request, wherein the physical data storage area comprises a plurality of data blocks that store data from the portion of the database. In some implementations, the operations may include determining an available space in each data block of the plurality of data blocks in the selected physical data storage area. In some implementations, the operations may include determining the available space associated with the portion of the database based on the available space in each data block.

BRIEF DESCRIPTION OF THE DRAWINGS

Aspects of the present disclosure are illustrated by way of example and are not limited by the accompanying figures with like references indicating like elements.

FIG. 2 illustrates an exemplary entry in a control file, according to various aspects of the invention.

FIGS. 5, 6, 7, and 8 illustrate exemplary reports generated by an application server, according to various aspects of the invention.

DETAILED DESCRIPTION

Figure 1:
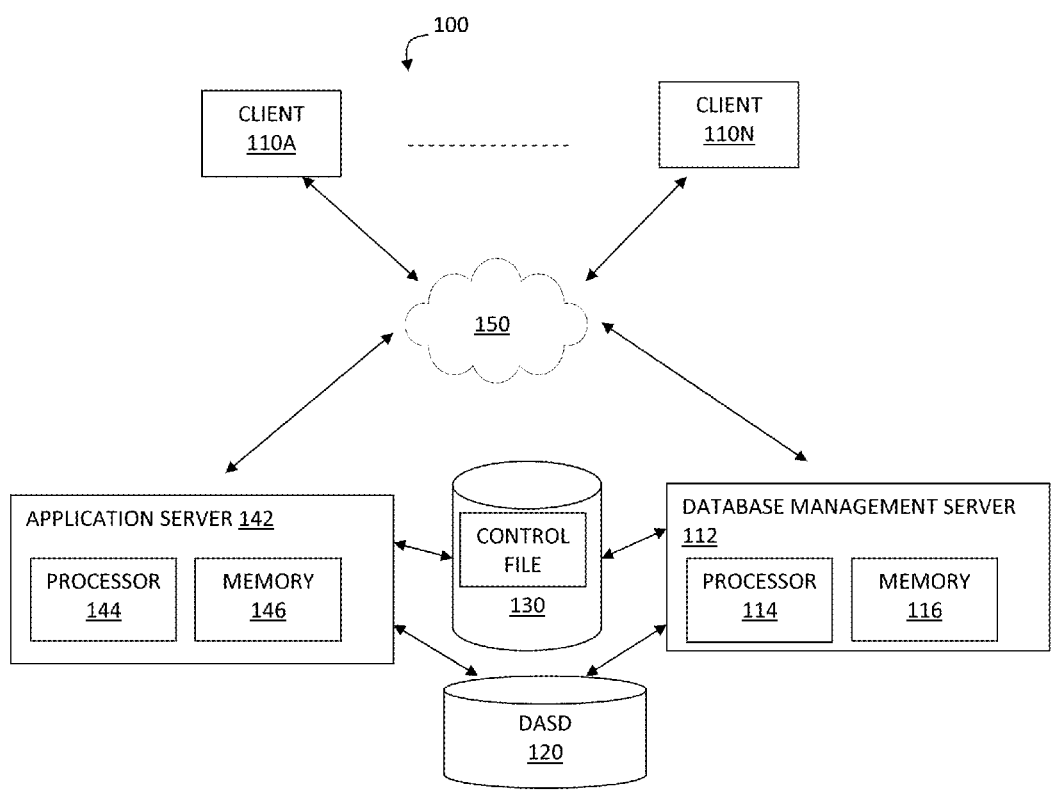
FIG. 1 illustrates an exemplary database management system, according to various aspects of the invention.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing Computer program code for carrying out operations for aspects of the present disclosure may be written in any combination of one or more programming languages, including an object oriented programming language such as Java, Scala, Smalltalk, Eiffel, JADE, Emerald, C++, CU, VB.NET, Python or the like, conventional procedural programming languages, such as the "C" programming language, Visual Basic, Fortran 2003, Perl, COBOL 2002, PHP, ASAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

FIG. 1 is block diagram illustrating a database management system 100, according to an aspect of the present disclosure. Database management system 100 may include, among other things, at least a database management server 112 that is configured to manage one or more relational databases and/or indexes for the relational databases; and an application server 142 that is configured to manage and run one or more applications. Database management server 112 and application server 142 may be communicatively coupled to one or more data storage access devices (DASD) 120 that may store/maintain one or more database tables associated with relational database(s), store/maintain one or more indexes for the tables in the database(s), and/or other data structures. In some implementations, database management server 112 and application server 142 may be communicatively coupled to a storage device 130 that stores at least one control file. In some implementations, database management server 112 and application server 142 may be communicatively coupled to a client device 110 (illustrated in FIG. 1 as a plurality of client devices 110A, . . . , 110N). Database management server 112 and application server 142 may be coupled to client device 110 via a network 150. Network 150 may include a Local Area Network, a Wide Area Network, a cellular communications network, a Public Switched Telephone Network, and/or other network or combination of networks.

In some implementations, one or more data rows associated with at least one database table/group of database tables may be stored in one or more data blocks. The one or more data blocks may be stored in a database entity called a data area. In other words, the data area (hereinafter referred to as "physical data storage area") may provide physical storage for data blocks associated with the at least one database table/group of database tables. In some implementations, the physical data storage area may correspond to a data set associated with an operating system, such as, z/OS operating system, z/VSE (Virtual Storage Extended) operating system, and/or other operating system as would be appreciated. In some implementations, DASD 120 may house the physical data storage area/data set.

In some implementations, when a physical data storage area is created, a data block length may be specified. The length of the data block may be limited by the geometry of DASD 120 housing the data set. When the physical data storage area is initialized (i.e., made ready to use), one or more formatted data blocks of the specified size may be stored therein.

In some implementations, database management server 112 may include a processor 114, a memory 116, and/or other components that facilitate the functions of database management server 112. In some implementations, processor 114 includes one or more processors configured to perform various functions of database management server 112. In some implementations, memory 116 includes one or more tangible (i.e., non-transitory) computer readable media. Memory 116 may include one or more instructions that when executed by processor 114 configure processor 114 to perform functions of database management server 112. In some implementations, memory 116 may include one or more instructions stored on tangible computer readable media that when executed at a remote device, such as client device 110, cause the remote device to view information associated with one or more databases, as described herein.

In some implementations, application server 142 may include a processor 144, a memory 146, and/or other components that facilitate the functions of application server 142. In some implementations, processor 144 includes one or more processors configured to perform various functions of application server 142. In some implementations, memory 146 includes one or more tangible (i.e., non-transitory) computer readable media. Memory 146 may include one or more instructions that when executed by processor 144 configure processor 144 to perform functions of application server 142. In some implementations, memory 146 may include one or more instructions stored on tangible computer readable media that when executed at a remote device, such as client device 110, cause the remote device to display at least one report, as described herein.

Database administrators (or other users) may interact with the database management server 112 via client device 110. In some implementations, client device 110 may include a computing/processing device such as a desktop computer, a laptop computer, a network computer, a wireless phone, a personal digital assistant, a tablet computing device, workstation, and/or other computing devices that may be utilized to interact with database management server 112. In some implementations, client device 110 may comprise a user interface (not otherwise illustrated in FIG. 1) that may enable users to perform various operations that may facilitate interaction with database management server 112 including, for example, providing requests to retrieve information from database tables associated with a database, creating tables, adding/deleting/updating rows/columns in database tables, creating/deleting/updating/accessing one or more indexes associated with the database tables, and/or performing other operations. Client device 110 may include a processor (not otherwise illustrated in FIG. 1), circuitry, and/or other hardware operable to execute computer-readable instructions.

In some implementations of the present disclosure, a user may interact with application server 142 via client device 110. In some implementations, client device 110 may comprise a user interface (not otherwise illustrated in FIG. 1) that may allows the user to perform various operations that may facilitate interaction with application server 142 including, for example, providing requests for determining available space in one or more data blocks, providing requests to generate one or more reports associated with database tables/data areas, receiving one or more reports associated with the database tables/data areas and displaying the reports, and/or performing other operations.

In some implementations, database management server 112 may manage various operations performed on the relational database(s) stored in DASD 120 and/or one or more database tables in the relational database(s). For example, database management server 112 may receive requests (for example, user requests, and/or other requests) to create table(s), add row(s)/column(s), delete row(s)/column(s), update row(s)/column(s), retrieve information from row(s)/column(s), and/or other requests. Database management server 112 may convert the requests to queries that may be run against the relational database(s) and may accordingly create one or more tables in the database(s), add one or more rows/columns to the tables in the database(s), delete one or more rows/columns from the tables in database(s), update one or more rows/columns in the tables in the database(s), retrieve requested information from the tables in the database(s), and/or perform other operations. In order to retrieve requested information from the database, database management server 112 may access one or more tables specified by the query (and/or request) to determine the information within the tables that matches a given request criteria specified in the query. Database management server 112 may then retrieve the determined information from the tables and provide it to the user.

In some implementations, database management server 112 may manage creation, deletion, updating, access, and/or other operations associated with one or more indexes for the tables in the relational database(s). Database management server 112 may create one or more indexes on one or more columns of one or more tables. An index entry may refer to one entry or index value that is in the index and references a given data row(s) of the database table. An index entry may consist of the value(s) contained in the column(s) being indexed for a given data row, and a pointer to the data row. The data row pointer may consist of a data block number/id within which the data row resides, and the unique row id. Most access requests within the relational database environment are based on index access. Index access typically refers to the pre-definition of a specific access path that is created using the value(s) of data column(s). Once created, the database can quickly retrieve data rows that have an index entry (data column value) that matches a given request criteria. In some implementations, the indices may be stored in a physical area in the DASD 120.

When a data row is added to an indexed table, database management server 112 may create an index entry in the index associated with the indexed table using the data value of the indexed column(s). Similarly, when a data row is deleted from or updated in an indexed table, database management server 112 may delete the appropriate index entry from the index or update the appropriate index entry in the index (for example, if the indexed column data value is changed/updated). When a request to retrieve particular information from a table in a database is received by database management server 112 (for example, in the form of search queries specifying an indexed column), database management server 112 may perform an index access to determine one or more index entries that include data values associated with the indexed column and/or that satisfy the request. Database management server 112 may identify data row pointers from the determined index entries that identify or serve as pointers to a specific data row(s) stored in DASD 120. Database management server 112 may accordingly retrieve one or more data rows associated with the data row pointers from DASD 120.

In some implementations, database management server 112 may manage the placement/storage of a plurality of data rows in at least one physical data storage area (i.e., in one or more data blocks of the physical data storage area) in DASD 120. In some implementations, database management server 112 may access one or more data blocks to add, delete, and/or update one or more data rows.

In some implementations, database management server 112 may manage a control file associated with at least one database. In some implementations, the control file may identify the location of one or more physical data storage areas in DASD 120. In some implementations, the control file may store one or more physical attributes associated with the one or more physical data storage areas. In some implementations, the physical attributes may be used to locate the physical data storage areas in DASD 120. In some implementations, the one or more physical attributes may include, among other things, a physical data storage area name, a dataset name, volume identifier(s), number of tracks in the physical data storage area, block size, and/or other attributes.

In some implementations, FIG. 2 depicts an exemplary entry in a control file. The control file identifies a physical data storage area (e.g., "ABC"). In some implementations of the present disclosure, as illustrated in FIG. 2, the control file identifies: i) the dataset associated with the physical data storage area by dataset name (e.g., "PROD.ABC"); ii) the volume(s) associated with the physical data storage area (e.g., "DCMSP1" and "DCMSP2"); iii) the number of tracks associated with the physical data storage area space (e.g., 30,000 tracks); and iv) the block size associated with the physical data storage area (e.g., 8192). As would be appreciated, the foregoing are non-limiting examples for illustrative purposes. The control file may include some or all of the foregoing example information as well as different values.

In some implementations, application server 142 may receive a request to determine an available space associated with one or more portions of a database. In some implementations, the request may include one or more parameters identifying the one or more portions of the database for which the available space is to be determined, reference group size, and/or other parameters. In some implementations, the one or more portions of the database may include one or more database tables associated with the database, one or more data blocks associated with the database, and/or other portions.

In some implementations, the request may identify at least one physical data storage area for which available space is to be determined. In some implementations, the request may include one or more parameters identifying the at least one physical data storage area, for example, the physical data storage area name, and/or other parameters.

In some implementations, application server 142 may determine at least one physical data storage area associated with the one or more portions of a database in response to the request. In some implementations, the physical data storage area may comprise one or more data blocks that store data (i.e., in the form of one or more data rows) from the one or more portions of the database.

In some implementations, application server 142 may determine the at least one physical data storage area associated with the one or more portions of a database based on the parameters included in the request. For example, the request may include a parameter identifying one or more database tables associated with the database. In some implementations, application server 142 may determine the physical data storage area(s) that comprises one or more data blocks that store data from the one or more database tables of the database. In some implementations, application server 142 may make the determination based on the control file. In some implementations, the control file may include an entry with table information that identifies the physical data storage area(s) that the database table(s) resides in. For example, the table information may include database table name and associated physical data storage area name(s), and/or other information. In some implementations, application server 142 may access the control file and identify an entry with table information associated with the database table(s) identified in the request. Application server 142 may determine the physical data storage area(s) based on the identified entry.

In some implementations, the request may include a parameter identifying the physical data storage area itself, for example, name of the physical data storage area. In these implementations, application server 142 may determine the at least one physical data storage area based on the name.

Figure 3:
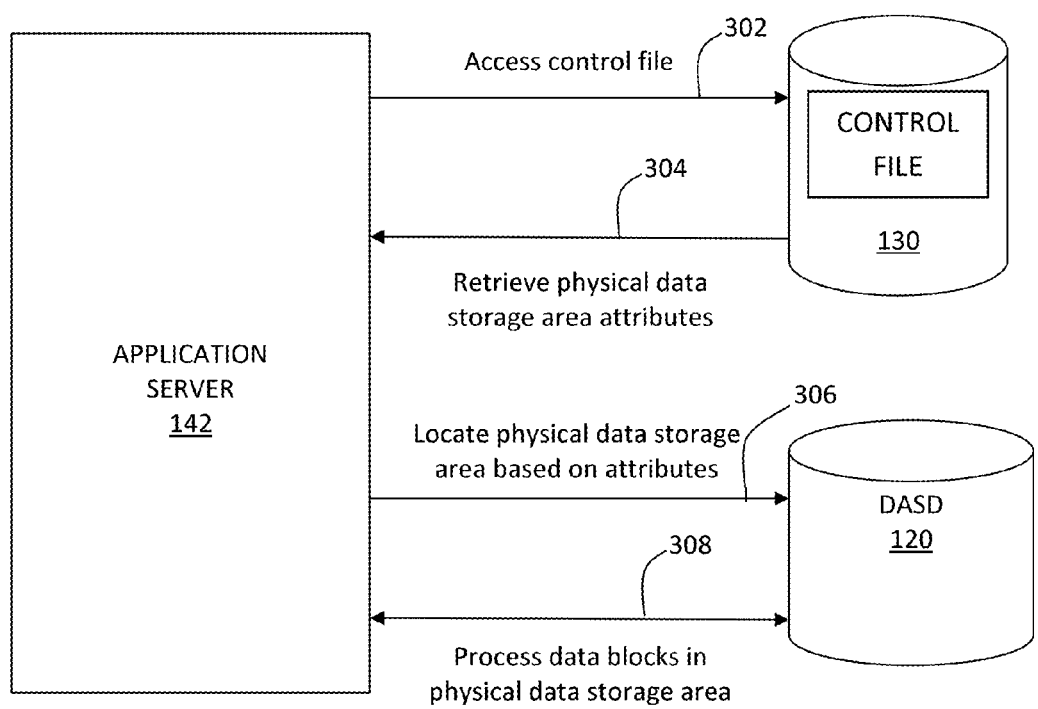
FIG. 3 illustrates an exemplary flow diagram for locating at least one physical data storage area, according to various aspects of the invention.

In some implementations, application server 142 may locate the determined physical data storage area in DASD 120. FIG. 3 illustrates an exemplary flow diagram for locating at least one physical data storage area in DASD 120, according to various implementations of the present disclosure. In some implementations, application server 142 may locate the determined physical data storage area based on a control file. In some implementations, in an operation 302, application server 142 may access the control file and identify an entry for the determined physical data storage area from among a plurality of physical data storage area entries in the control file. In some implementations, application server 142 may use a parameter identifying the determined physical data storage area, for example, name or other parameter, to identify the entry for the determined physical data storage area.

In some implementations, in an operation 304, application server 142 may retrieve one or more physical attributes associated with the determined physical data storage area from the control file. In some implementations, in an operation 306, application server 142 may locate the determined physical data storage area in DASD 120 based on the one or more physical attributes. In some implementations, in an operation 308, application server 142 may process one or more data blocks in the located physical data storage area. In some implementations, application server 142 may process each data block to determine an available space in the data block and the number of new rows that can be added to the data block.

For example, the request may identify a database table by name. Application server 142 may determine that physical data storage area "ABC" stores the database table. Application server 142 may access the control file to identify an entry for physical data storage area "ABC". Application server 142 may retrieve physical attribute(s) associated with the physical data storage area "ABC" from the control file. For example, application server 142 may retrieve volume identifiers associated with the physical data storage area. Application server 142 may locate the physical data storage area in DASD 120 based on the retrieved volume identifiers. Application server 142 may then process data block(s) in the located physical data storage area.

In some implementations, application server 142 may determine an available space in each data block of the one or more data blocks in the located physical data storage area. In some implementations, application server 142 may process each data block separately. In some implementations, the processing may be done without accessing portions of the database for which available space is determined. In other words, application server 142 may process data blocks without utilizing the resources of database management server 112. Instead, application server 142 may use (i.e., directly access) the physical data storage area to determine available space/space usage. In this manner, space usage of the database may be determined without using database resources and obtaining an estimate of space usage based on actual, physical, storage blocks. In one implementation, since the control file identifies the physical location and format (block size, tracks, etc.) of the physical data storage area, the application server 142 can use this information to directly access the physical DASD 120 using the underlying operating system commands for accessing DASD. The application server 142 can use other physical data storage area and database table attributes in the control file (along with an understanding of the data block construction for this specific database) to analyze the physically accessed data block(s) and determine the amount of space that is "in-use" and the amount of space that is "available". This is an exemplary implementation that allows the space usage to be calculated without using the resources of database management server 112, however, other implementations may also be utilized without departing from the scope of the present disclosure.

Figure 4:
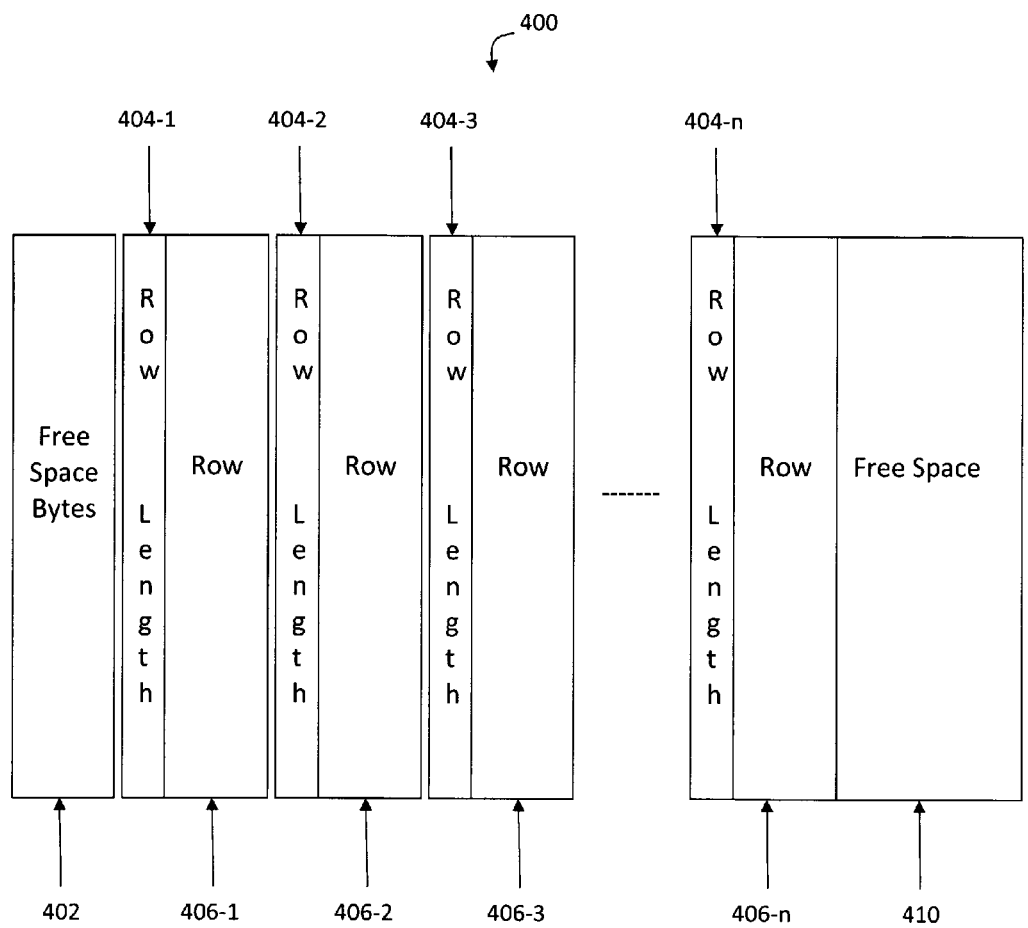
FIG. 4 illustrates exemplary structure of a data block, according to various aspects of the invention.

FIG. 4 is a block diagram illustrating a structure of a data block 400 to be processed. Data block 400 may include a certain number of bytes that store data and meta-data. For example, in some implementations of the present disclosure, portion 402 of data block 400 may indicate an amount of free space (such as a number of free bytes) in data block 400. In some implementations, the free space may represent an amount of unused space in data block 400. In some implementations, portion 402 may be updated as data rows are added, deleted, updated, compressed, or otherwise altered so that the amount of free space is indicated by portion 402. In some implementations, portion 402 may be represented by the first two bytes of data block 400. In some implementations, portion 404-1 of data block 400 may indicate a first row length of a first row and a table identifier identifying the database table the first row belongs to. In some implementations, the length portion of 404-1 may be represented by the third and fourth bytes of data block 400 while the table identifier portion may be represented by the fifth and sixth bytes of data block 400. In some implementations, portion 406-1 of data block 400 may indicate the first row. Similarly, portion 404-2 may indicate a second row length and a table identifier identifying the database table the second row indicated by portion 406-2 resides in, portion 404-3 may indicate a third row length and a table identifier identifying the database table that the third row indicated by portion 406-3 resides in, and so on. In some implementations, portion 410 of data block 400 may include free space in data block 400. In other words, portion 410 may accommodate one or more additional data rows. In some implementations, the amount of space in portion 410 corresponds to the free space indicated by portion 402.

In some implementations, application server 142 may process data block 400. In some implementations, application server 142 may determine an amount of free space in data block 400 based on portion 402.

In some implementations, application server 142 may determine an amount of deleted space by processing each data row 406-1, 406-2, 406-3, . . . , 406-n until portion 410 is reached. In some implementations, application server 142 may access portion 404-1 to determine the row length of the first data row in portion 406-1. Application server 142 may process data row in portion 406-1. Application server 142 may skip to portion 404-2 which is located at the end of portion 406-1 and process data row in portion 406-2. Application server 142 may similarly skip to portions 404-3, . . . , 404-n and process data rows in portions 406-3, . . . , 406-n until portion 410 is reached. In some implementations, while processing the data rows, application server 142 may identify deleted data rows. In some implementations, the deleted row (s) may be marked in data block 400 by changing the associated table identifier(s) from a valid table identifier(s) to binary zeros, The amount of "deleted space" created by one or more deleted data rows in the data block may be represented in bytes. In some implementations, a data row may be considered deleted when it is physically deleted from the data block. In some implementations, a data row may be considered deleted when it is logically deleted (i.e., data row is deleted but not yet committed) from the data block.

In some implementations, application server 142 may determine the available space in each data block. In some implementations, the available space may be based on the amount of free space in the data block and the amount of deleted space in the data block.

In some implementations, the available space ("$A_{SPACE}$") in a data block may be determined by the following equation:

$$A_{SPACE}=(F_{SPACE}+D_{SPACE}) \quad (1),$$

where $F_{SPACE}$ represents the amount of free space in the data block and $D_{SPACE}$ represents the amount of deleted space in the data block.

In some implementations, application server 142 may access portion 402 to determine the amount of free space in the data block. In some implementations, application server 142 may identify the deleted data rows while processing the data rows found in the data block based on the table identifier (i.e., modified table identifier). In some implementations, application server 142 may determine the deleted space created by the deleted data rows based on the row lengths of the individual deleted rows.

In some implementations, application server 142 may determine one or more parameters associated with the data block while processing the data block. The one or more parameters may include bytes in-use, bytes free space, number of active data rows (i.e., not deleted data rows), maximum row size, minimum row size, average row size, and/or other parameters.

In some implementations, application server 142 may determine bytes in-use per data block based on the following equation:

$$(B_L - A_{SPACE}) \quad (2),$$

where $B_L$ represents the length of the data block. The length of the block may be represented in bytes.

In some implementations, application server 142 may determine a number of new rows that can be added to the data block based on the available space in the data block. In some implementations, application server 142 may determine a number of new rows that can be added to the data block based on the available space in the data block and an average row size for the data block. In some implementations, application server 142 may determine the average row size for the data block.

In some implementations, application server 142 may determine a number of new data rows that can be added to the data block based on the following equation:

$$(A_{SPACE}/\text{Average row size}) \quad (3)$$

In some implementations, application server 142 may determine a total available space associated with the one or more portions of the database based on the determined available space in each data block. In some implementations, application server 142 may determine the total available space in the one or more data blocks in the physical data storage area associated with the one or more portions of the database. In other words, application server 142 may determine the total available space by adding the available space determined for each data block of the one or more data blocks.

In some implementations, application server 142 may determine a total number of new rows that can be added to the one or more data blocks based on the determined number of new rows that can be added to each data block (i.e., by adding the number of new rows of each data block).

In some implementations, application server 142 may generate one or more reports. In some implementations, application server 142 may generate the report(s) in response to the request. A report may include, among other things, the available space in each data block, the number of new rows that can be added to each data block, the total available space in the one or more data blocks, and the total number of new rows that can be added to the one or more data blocks.

FIG. 5 depicts an exemplary report 500 generated by application server 142, according to various aspects of the present disclosure. In some implementations, the report 500 may be generated based on information in control file. FIG. 5 and other figures illustrating an example of a report is for illustrative purposes only and should not be viewed as limiting. The report may include various formats and configurations while including or excluding some header items and values illustrated and adding other header items and values not otherwise illustrated in the figure as would be appreciated.

In some implementations, report 500 may be a summarized view of information regarding a physical data storage area (depicted in the right hand section of report 500) and database table (depicted in the left hand section of report 500). For example, the report indicates one or more parameters such as, without limitation: the table named "REO" is in physical data storage area "REO" (of database 1022); a total number of blocks in the physical data storage area—1800; a number of blocks in-use in the physical data storage area (i.e., with at least one data row in them)—890; a number of unused blocks in the physical data storage area—910; a percentage of blocks in-use in the physical data storage area—49%; a block length for data blocks in the physical data storage area—4,096 bytes; a dynamic extend option for the physical data storage area—turned off (i.e., the physical data storage area may not be dynamically extended; a DSOP (data space management option) mode for the physical data storage area that determines how new data rows are added and how deleted data row space is re-used—"RANDOM FOR REORGANIZATION"; a row length—112 bytes; a number of data rows in the physical data storage area—31,950; and/or other parameters FIG. 5 illustrates an exemplary report for the case where one database table resides in one physical data storage area. However, it will be appreciated that other cases may exist and the reports generated accordingly. For example, there may be a case where multiple database tables may have the same physical data storage area information (i.e., multiple database tables may reside in one physical data storage area). Another case may be where partitioned database tables may have ranges of data rows stored in different physical data storage areas.

FIG. 6 depicts an exemplary report 600 generated by application server 142, according to various aspects of the present disclosure. In some implementations, the report may have four sections 602, 604, 606, and 608. Section 602 may describe a summary of information associated with the physical data storage area being processed to determine available space in the data blocks associated with the physical data storage area. "REO" may indicate the name of the physical data storage area being processed. The block size for data blocks in the physical data storage area as illustrated is 4,096 bytes. The number of tracks as illustrated is 150. The number of data blocks in the physical data storage area is 1800. The database table name is REO. The row length for data rows in the data blocks as illustrated is 112 (i.e., the data rows have a fixed row length because there is no compression of data rows, for example). The number of active rows (i.e., not deleted) rows in the data blocks of the physical data storage area as illustrated is 31,950.

Section 604 may describe a report header. "GROUP" may indicate a particular reference group being processed. In some implementations, a reference group may include a group of blocks. "BLOCKS IN-USE" may indicate a number of data blocks in-use (i.e., have at least one data row in them) in the reference group. "BLOCKS IN-USE %" may indicate a percentage of the data blocks in-use in the reference group. "BLOCKS EMPTY" may indicate a number of data blocks that are empty (i.e., have no data rows in them) in the reference group. "BLOCKS EMPTY %" may indicate a percentage of the data blocks that are empty in the reference group. "KBYTES IN-USE" may indicate the amount of space (in kilobytes) that is in-use in the reference group. "KBYTES IN-USE %" may indicate a percentage of the amount of space that is in-use in the reference group. "KBYTES EMPTY" may indicate the amount of free space (in kilobytes) in the reference group. "KBYTES EMPTY %" may indicate a percentage of the amount of free space in the reference group. "ROWS IN-USE" may indicate a number of data rows that are in-use (i.e., are active and not deleted) in the reference group. "ROWS DELETED" may indicate a number of data rows that are deleted (i.e., physically and logically deleted) in the reference group. "ROWS AVAILABLE" may indicate a number of new data rows of average size that can be added to data blocks in the reference group. "FREESPACE MAX" may indicate a maximum amount of free space in any data block in the reference group. "FREESPACE MIN" may indicate a minimum amount of free space in any data block in the reference group. "FREESPACE AVG" may indicate an average amount of free space per data block in the reference group. "ROWS MAX" may indicate a maximum number of data rows found on any data block in the particular reference group. "ROW MIN' may indicate a minimum number of data rows found on any data block in the reference group. "ROW AVG" may indicate an average number of data rows per data block. "ROWLEN MAX" may indicate a maximum data row length per data block in the reference group. "ROWLEN MIN" may indicate a min data row length per data block in the reference group. "ROWLEN AVG" may indicate an average data row length per data block in the reference group. "FREESPACE IN BLOCKS" may indicate amounts of free space (by size) in data blocks of the reference group. A field "FREESPACE" may be used in the report to represent the combined space of both the free space in the data block and the re-usable (available) deleted row space in the data block.

In some implementations, section 606 may provide detailed information regarding each reference group associated with the physical data storage area. As illustrated in FIG. 6, the reference group size is 500 blocks. Thus, a total number of 1800 data blocks in the physical data storage area is divided into 4 reference groups. Reference groups 1-3 each have 500 data blocks, and reference group 4 has the remaining 300 data blocks.

In some implementations, application server 142 may determine the values depicted in section 606 for parameters indicated in section 604 while processing the data blocks in the physical data storage area "REO".

Reference group 1, for example, has all 500 data blocks in-use and no empty data blocks, which indicates that the blocks in-use percentage is 100%. The amount of space in-use in reference group 1 is 1970 kilobytes. Space in-use (i.e., kilobytes in-use) may be determined by adding the bytes used to store the row-length headers (for example, 404-1, 404-2, etc.) and the rows (for example, 406-1, 406-2, etc.) associated with data blocks in the reference group. The amount of free space in reference group 1 as illustrated is 30 kilobytes. The number of data rows in-use as illustrated is 18,000. The maximum, minimum, and average amount of free space per data block in reference group 1 is 62 bytes. The maximum, minimum, and average number of data rows per data block in reference group 1 is 36. The maximum, minimum, and average row length per data block in reference group 1 is 112 bytes. There are no deleted rows and no new data rows of average size can be added to the data blocks in this reference group. Since the maximum freespace for any data block in this group is 62 bytes and the average row length is 112 bytes, there is no freespace area in any data block that is large enough to add a new data row (to this group of data blocks). The free space in blocks section indicates that there a 500 data blocks in reference group 1 that have less than or equal to ¼K of free space in them. In some implementations, application server 142 may determine these values while processing the data blocks in reference group 1. Values for reference groups 2-4 may be similarly determined and displayed in section 606, as depicted in FIG. 6.

In some implementations, section 608 may provide a summarization of results for all the reference groups which may indicate totals for the physical data storage area. For example, section 608 may indicate that out of 1800 total data blocks, 890 data blocks are in-use and 910 are empty. The total amount of space in-use as illustrated is 3,498 kilobytes and the total amount of free space is 3,694 kilobytes. The total number of data rows is 31,950 and the number of new data rows that can be added is 32,778. The maximum amount of free space per data block is 4,094 bytes, minimum amount of free space per data block is 62 bytes and the average amount of free space per data block is 2,104 bytes. The maximum number of data rows per data block is 36, the minimum number of data rows per data block is 0, and the average number of data rows per data block is 18. The maximum, minimum, and average row length per data block is 112 bytes. The free space in blocks section indicates that there are 887 data blocks with less than or equal to ¼K free space in them, 1 data block with greater than 2K but less than or equal to 3K of free space in it, and 910 data blocks with greater than 3K but less than or equal to 4K of free space in them. In some implementations, application server 142 may determine these total values for all the reference groups depicted in section 608.

For purposes of simplicity, FIG. 6 depicts values for reference groups (including a group of data blocks), however, values for each data block processed may also be depicted without departing from the scope of this disclosure.

In some implementations, data management server 112 may perform a database reorganization process for the reference group(s), the data blocks, and/or other portion of the database. In some implementations, the database reorganization process may move data rows among data blocks and may use empty data blocks to improve data row ordering. In some implementations, the percentage of data blocks in-use may increase after the database reorganization. In these implementations, a block in-use may be only partially full and may have space to add more data rows.

In some implementations, a user may attempt to extend a physical data storage area based on the blocks in-use percentage. However, the blocks in-use percentage may provide an inaccurate indication that the physical data storage area is full. In other words, the blocks in-use percentage may not provide a complete indication of space usage. For example, if most of the data blocks in the physical data storage have only a few data rows in them (i.e., are partially full), they would be considered as blocks in-use even though they may have additional space to accommodate more data rows. In this example, even though the block in-use percentage may be high, actual space usage may be low. As such, the user may attempt to extend the physical data storage area based on the blocks in-use percentage when doing so is unnecessary.

In some implementations, a physical data storage area extension may be performed offline or online. Online extensions pause all processing being performed on the physical data storage area while the extension is being performed. Reducing the number of database outages to do unnecessary physical data storage area extensions, and reducing the number of pauses caused by unnecessary online (on command) extensions, will improve the overall 24*7 availability of the database. Moreover, resource consumption (over allocated physical data storage area sizes) may be reduced.

By utilizing the reports (for example, reports 500 and 600 or other reports based on disclosures described herein) generated by application server 142, the user may receive an accurate indication of the fullness of a physical data storage area (i.e., total kilobytes in-use in section 608 of FIG. 6) and/or number of new data rows of average size that can be added to the data blocks in the physical data storage area (i.e., total rows available in section 608 of FIG. 6). As such, based on the reports, users may make more informed decisions on whether a physical data storage area needs to be extended. In many cases, the reports may facilitate a reduction in the number of extensions performed, thereby reducing database outages or interruptions. The user may also avoid extending data areas when not needed reducing the requirements for physical DASD.

FIGS. 7 and 8 depict exemplary reports 700 and 800 generated by application server 142 after a significant amount of the data rows have been deleted and re-added by database processing causing the data rows to be spread across more data blocks. Report 700 indicates that there are now 1241 data blocks in-use even though the same number of rows (31,950) exist, which is 251 more data blocks than prior to the database processing. The number of unused data blocks after the processing is 559 and the percentage of blocks in-use is 68% which is an increase of 19% even though the number of rows has not changed. The reason that the number of data blocks in-use increased (from 890 to 1,241) was that the database processing deleted a large number of data rows without committing the deletion and then added the same number of rows.

In some implementations, report 800 has sections 802, 804, 806, and 808 that are similar to sections 602, 604, 606, and 608 of report 600. As such, after the database processing, while there are more data blocks in-use, the number of data rows in the physical data storage area remained the same (31,950) and the number of new data rows that can be added to data blocks in the physical data storage area also remained the same (32,778).

In some implementations, the reports of FIGS. 5, 6, 7, and 8 may be generated while the database is online (i.e., open for processing).

In some implementations, database tables and/or data rows in database tables may be compressed by database management server 112 before storing them on DASD 120 in the form of, for example, compressed data rows in the data blocks. Thus, the various operations described above may be performed by application server 142 on the compressed tables/rows. Because the amount of compression found in each data row will vary, the average row length measurement provides a reasonable measurement for the compressed data row(s) size. As such, the number of new compressed data rows that can be added to a data block may be an estimate based on the average row sizes per data block and the available space in each block.

Figure 9:
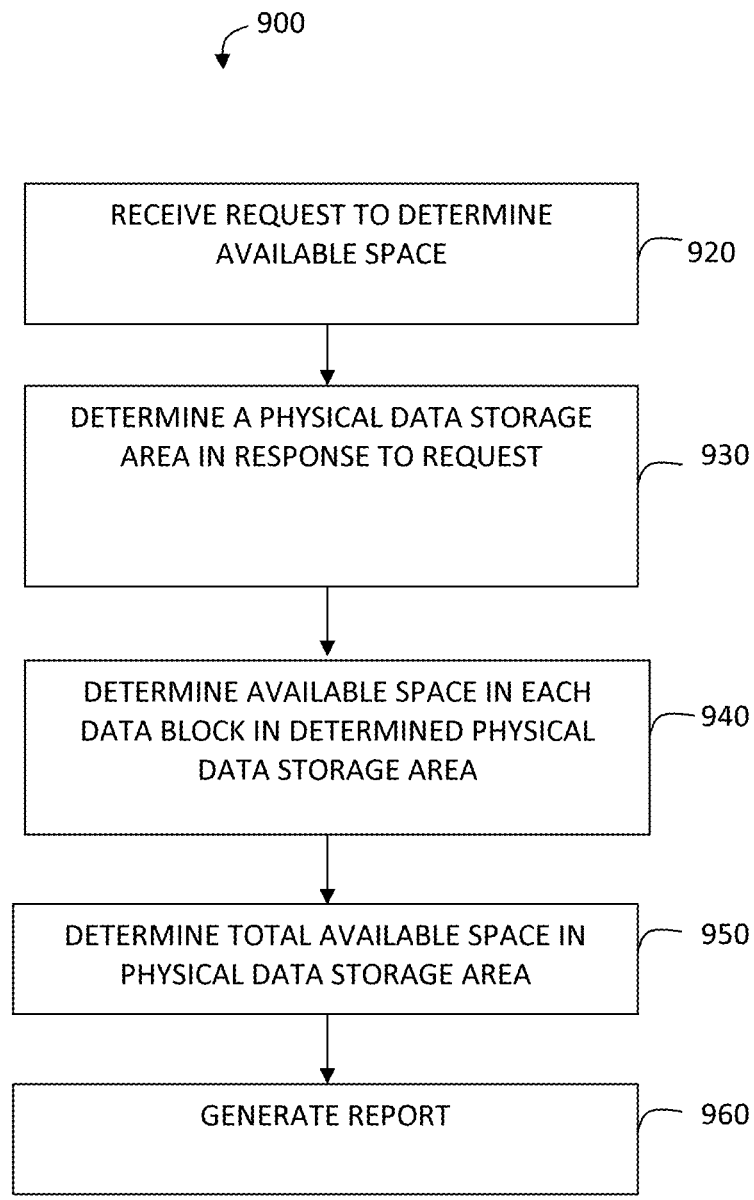
FIG. 9 is a flowchart depicting example operations performed by an application server to determine an available space in one or more data blocks, according to various aspects of the invention.

FIG. 9 is a flowchart 900 depicting example operations performed by an application server 112 to determine an available space in one or more data blocks associated with a physical data storage area, according to various aspects of the present disclosure. The various processing operations depicted in FIG. 9 are described in greater detail herein. The described operations for a flow diagram may be accomplished using some or all of the system components described in detail above and, in some implementations of the present disclosure, various operations may be performed in different sequences. In some implementations, additional operations may be performed along with some or all of the operations shown in FIG. 9. In yet other implementations, one or more operations may be performed simultaneously. In yet other implementations, one or more operations may not be performed. Accordingly, the operations described are exemplary in nature and, as such, should not be viewed as limiting.

In an operation 920, process 900 may receive a request to determine an available space associated with one or more portions of a database. In some implementations, the request may include one or more parameters identifying the one or more portions of the database for which the available space is to be determined, reference group size, and/or other parameters.

In some implementations, in an operation 930, process 900 may determine a physical data storage area associated with the one or more portions of the database in response to the request. In some implementations, the physical data storage area may comprise one or more data blocks that store data from the one or more portions of the database.

In some implementations, in an operation 940, process 900 may determine an available space in each data block of the one or more data blocks in the determined physical data storage area. In an operation 950, process 900 may determine a total available space associated with the one or more portions of the database based on the available space in each data block.

In some implementations, in an operation 960, process 900 may generate at least one report, for example (report(s) depicted in FIGS. 5-8). In some implementations, the generated report may include the determined available space in each data block, the number of new rows that can be added to each data block, the total available space in the one or more data blocks, and the total number of new rows that can be added to the one or more data blocks.

In some implementations, one or more operations of process 900 may be performed in response to a user request (or other request) to determine an available space in one or more data blocks associated with a physical data storage area, or in response to a user request (or other request) to generate a report describing the available space in the physical data storage area and the number of new data rows that can be added to the physical data storage area.

In some implementations, one or more operations of process 900 may be performed while the database is online. In some implementations, the operations may be performed while the database is offline. In some implementations, the one or more operations may be performed without utilizing resources associated with the database management server 112. In some implementations, application server 142 may use an efficient I/O process that has no effect on database processing being performed by database management server 112 (for example, managing and/or executing database requests).

Implementations of the present disclosure may be described as including a particular feature, structure, or characteristic, but every aspect or implementation may not necessarily include the particular feature, structure, or characteristic. Further, when a particular feature, structure, or characteristic is described in connection with an aspect or implementation, it will be understood that such feature, structure, or characteristic may be included in connection with other implementations, whether or not explicitly described. Thus, various changes and modifications may be made to the provided description without departing from the scope or spirit of the present disclosure.

Other embodiments, uses and advantages of the present disclosure will be apparent to those skilled in the art from consideration of the specification and practice of the present disclosure disclosed herein. The specification and drawings should be considered exemplary only, and the scope of the present disclosure is accordingly intended to be determined solely by the appended claims.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

What is claimed is:

1. A computer-implemented method of determining available space in one or more data blocks, the method executed by one or more processors configured to perform a plurality of operations, the operations comprising:

receiving a request to determine an available space associated with a portion portions of a database;

determining a physical data storage area associated with the one or more portions portion of the database in response to the request, wherein the physical data storage area comprises a plurality of data blocks that store data from the portion of the database, wherein each data block comprises a plurality of data rows, wherein said determining a physical data storage area further comprises:
  accessing a control file associated with the database, wherein the control file stores information regarding a plurality of physical attributes associated with the physical data storage area; and
  retrieving the plurality of physical attributes from the control file; and locating the physical data storage area based on the retrieved plurality of physical attributes;
determining an available space in each data block of the plurality of data blocks in the determined physical data storage area;
determining a total available space associated with the portion of the database based on the available space in each data block;
determining a number of new data rows that can be added to each data block based on the determined available space;
determining a total number of new rows that can be added to the plurality of data blocks based on the determined number of new rows that can be added to each data block; and
generating a report that comprises the determined available space in each data block, the number of new rows that can be added to each data block, the total available space in the plurality of data blocks, and the total number of new rows that can be added to the plurality of data blocks.

2. The computer-implemented method of claim 1, further comprising:
  determining an average row size for each data block; and
  determining a number of new rows that can be added to each data block based on the determined available space and the determined average row size.

3. The computer-implemented method of claim 1, wherein said operations are performed while the database is online.

4. A computer-implemented system of determining an available space in one or more data blocks, the system comprising:
  a processor configured to:
    receive a request to determine an available space associated with a portion of a database;
    determine a physical data storage area associated with the portion of the database in response to the request, wherein the physical data storage area comprises a plurality of data blocks that store data from the portion of the database, wherein each data block comprises a plurality of data rows, wherein the determination of the physical data storage area, comprises:
      accessing a control file associated with the database, wherein the control file stores information regarding a plurality of physical attributes associated with the physical data storage area; and
      retrieving the plurality of physical attributes from the control file; and locating the physical data storage area based on the retrieved plurality of physical attributes;
    determine an available space in each data block of the plurality of data blocks in the determined physical data storage area;
    determine a total available space associated with the portion of the database based on the available space in each data block;
    determine a number of new data rows that can be added to each data block based on the determined available space;
    determine a total number of new rows that can be added to the plurality of data blocks based on the determined number of new rows that can be added to each data block; and
    generate a report that comprises the determined available space in each data block, the number of new rows that can be added to each data block, the total available space in the plurality of data blocks, and the total number of new rows that can be added to the plurality of data blocks.

5. The computer-implemented system of claim 4, wherein the processor is further configured to:
  determine an average row size for each data block; and
  determine a number of new rows that can be added to each data block based on the determined available space and the determined average row size.

6. A computer program product comprising:
  a non-transitory computer readable storage medium having computer readable program code embodied in the medium that when executed by a processor of a computer system causes the computer system to perform operations comprising:
    receiving a request to determine an available space associated with a portion portions of a database;
    determining a physical data storage area associated with the one or more portions portion of the database in response to the request, wherein the physical, data storage area comprises a plurality of data blocks that store data from the portion of the database, wherein each data block comprises a plurality of data rows, wherein said determining a physical data storage area further comprises:
      accessing a control file associated with the database, wherein the control file stores information regarding a plurality of physical attributes associated with the physical data storage area; and
      retrieving the plurality of physical attributes from the control file; and locating the physical data storage area based on the retrieved plurality of physical attributes;
    determining an available space in each data block of the plurality of data blocks in the determined physical data storage area;
    determining a total available space associated with the portion of the database based on the available space in each data block;
    determining a number of new data rows that can be added to each data block based on the determined available space;
    determining a total number of new rows that can be added to the plurality of data blocks based on the determined number of new rows that can be added to each data block: and
    generating a report that comprises the determined available space in each data block, the number of new rows that can be added to each data block, the total available space in the plurality of data blocks, and the total number of new rows that can be added to the plurality of data blocks.

7. The computer program product of claim 6, wherein the computer program product further comprises:
  a computer readable program code configured to determine an average row size for each data block; and a computer readable program code configured to determine a number of new rows that can be added to each data block based on the determined available space and the determined average row size.

\* \* \* \* \*